United States Patent [19]

Schweiss et al.

[11] Patent Number: 5,094,674
[45] Date of Patent: Mar. 10, 1992

[54] DEVICE FOR SEPARATION OF AIR FROM FLOTATION SLUSH

[75] Inventors: Peter Schweiss, Langenau; Hans-Dieter Dorflinger; Michael Nolte, both of Heidenheim, Fed. Rep. of Germany

[73] Assignee: J. M. Voith GmbH, Heidenheim, Fed. Rep. of Germany

[21] Appl. No.: 671,516

[22] Filed: Mar. 19, 1991

[30] Foreign Application Priority Data

Mar. 21, 1990 [DE] Fed. Rep. of Germany ....... 4009042

[51] Int. Cl.$^5$ .............................................. B01D 19/02
[52] U.S. Cl. .................................. 55/178; 210/512.1; 209/211; 55/459.1
[58] Field of Search ..................... 210/512.1; 55/128.459.1; 209/211

[56] References Cited

U.S. PATENT DOCUMENTS

| 4,553,990 | 11/1985 | Hoffman | 55/178 |
| 4,749,490 | 6/1988 | Smyth et al. | 209/211 |
| 4,797,203 | 1/1989 | Macierewicz | 209/211 |

FOREIGN PATENT DOCUMENTS

| 3519374 | 1/1987 | Fed. Rep. of Germany | 55/178 |
| 225342 | 7/1985 | German Democratic Rep. | 55/178 |

*Primary Examiner*—Bernard Nozick
*Attorney, Agent, or Firm*—Jeffers, Hoffman & Niewyk

[57] ABSTRACT

A device for separation of air from fiber suspensions of flotation devices which are heavily air- and foam-laden or represent a mixture of fluid and foam features a hydrocyclone whose inlet opening is arranged least 2.5 m below the outlet opening of the flotation device for the air-laden fluid or mixture. The separation section of the hydrocyclone is a slender, truncated cone-shaped body on whose pointed (thin) end the deaerated fluid is withdrawn. In this outlet opening there is a back pressure maintained, so that the inlet opening is not completely covered by the vortex of the fluid, leaving still a sufficiently free entrance cross section for the foam. Above the entrance section of the hydrocyclone a mechanical foam eliminator with a rotor is arranged, the rotor comprising an impeller wheel which is provided with radial blades. A funnel-shaped suction socket feeds the foam-air mixture to the impeller wheel.

10 Claims, 2 Drawing Sheets

DEVICE FOR SEPARATION OF AIR FROM FLOTATION SLUSH

BACKGROUND OF THE INVENTION

The invention concerns a device for the separation of air from a suspension which accrues in a flotation device as a heavily foam-laden slush or sludge material.

The separation of air from slush accruing in the flotation of, for example, fiber suspensions in wastepaper conditioning is a considerable problem. Foam eliminators have already been developed, but these cannot lead to a deaeration of the entire flotation slush.

A prior foam eliminator has been described in German patent disclosure 35 19 374.

SUMMARY OF THE INVENTION

According to the invention, a hydrocyclone of a specific design is connected in a specific way to the collection tank for the flotation slush of the flotation device. The deaerated suspension is withdrawn from the outlet end of the conic part of the hydrocyclone. At this opening a back pressure is adjusted which is controlled so that a relatively large, narrow entrance opening of the hydrocyclone, for the suspension which is still heavily saturated with air, is not completely closed by the fluid vortex which forms in the hydrocyclone. Thus, sufficient entrance cross section still remains for the foam share to enter the hydrocyclone. A gas or air core forms in the hydrocyclone due to a relatively high speed of rotation, in which the foam also collects to a large part. This foam is forced upward by the prevailing influx pressure, where it proceeds to the mechanical foam eliminator featuring a rotor which is provided with radial plates, by way of a conic, truncated or pyramid-shaped suction socket. Thus, relatively high shear forces are exerted on the foam bubbles, causing their destruction. The air proceeds upward into the open, while the separated liquid drains from the bottom part of this foam eliminator.

Preferably, a vortex core support of rotationally symmetric shape is located on the outlet end, in the cone point of the truncated cone part of the hydrocyclone. The height of the vortex core support amounts preferably to 3–8% of the diameter of this outlet opening for the deaerated fluid when the vortex core support is mounted on one of the baffle plates arranged opposite from the said outlet opening, which baffle plate is spaced from the outlet opening between 10 and 25% of the diameter of this opening. The outside diameter of this baffle plate amounts preferably to between two and three times the diameter of this outlet opening.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
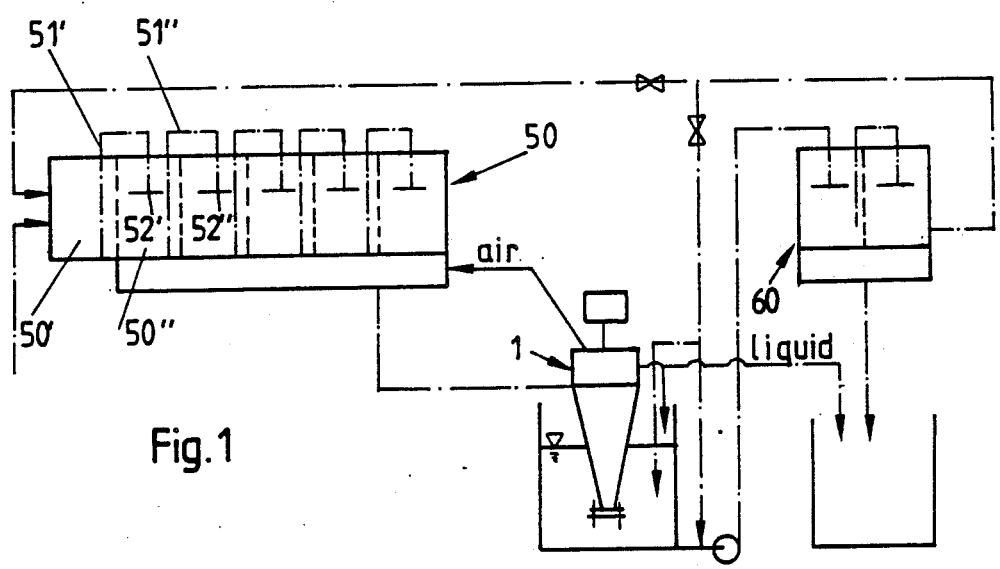
FIG. 1 shows a basic illustration of the arrangement of the flotation device including the arrangement of the deaeration device, essentially in longitudinal section of the flotation device.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

The deaeration device will be described further with the aid of the drawings. As best shown in FIGS. 3 through 6, hydrocyclone 1 features a cylindrical entrance section 2 and a truncated cone-shaped separation section 3 whose cone point angle ranges between 8° and 16°. The inlet opening 4 for the slush or sludge-like mixture of fluid and foam, heavily saturated with air, is relatively narrow, having a ratio of width b to height h b/h=2:5 through 1:4, preferably 1:3. Provided on the outlet end for the deaerated fluid, at the truncated cone point, is a baffle plate 8 spaced from the outlet opening 6 between 10 and 25% of the (radially outer) diameter of said opening. A vortex core support 9 is centrally arranged on this baffle plate 8, having a height between 3 and 8%, and a diameter between 10 and 20% of the (radially outer) diameter of said outlet opening 6. Installed opposite the baffle plate is a backing plate 7 of same diameter, which is mounted on the outlet opening of the hydrocyclone. The spacing between the two plates is established by flange parts 30 which are fixed in place by means of bolt 31 and nut 32. The diameter of the baffle plate 8 (equaling the outside diameter of the backing plate 7) amounts to between twice and three times the diameter of the outlet opening 6.

Figure 3:
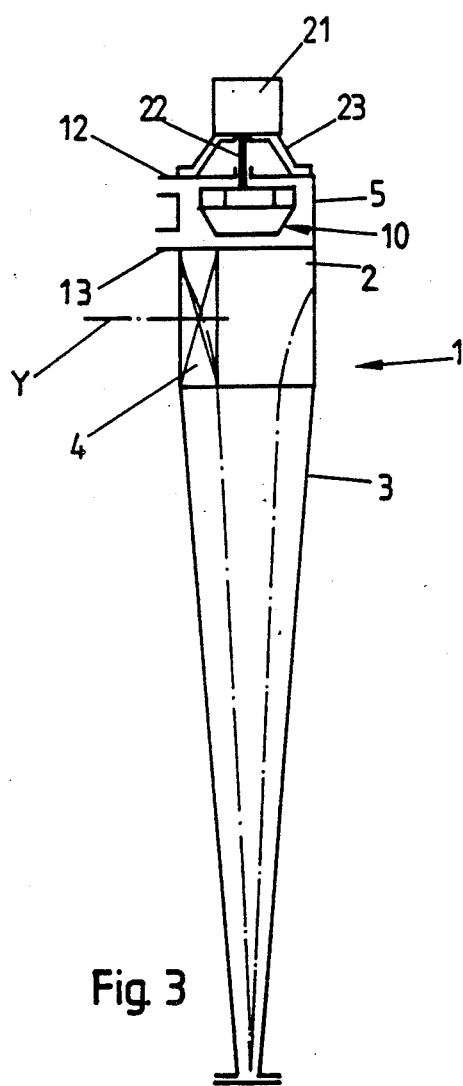
FIG. 3 is a basic axial section of the deaeration device.
Figure 6:
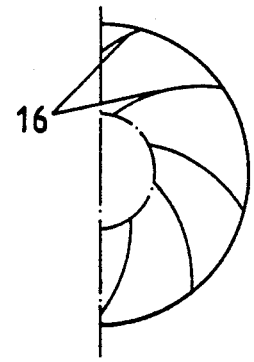
FIG. 6 is a cross section of the impeller wheel of the rotor of the mechanical foam eliminator.
Figure 4:
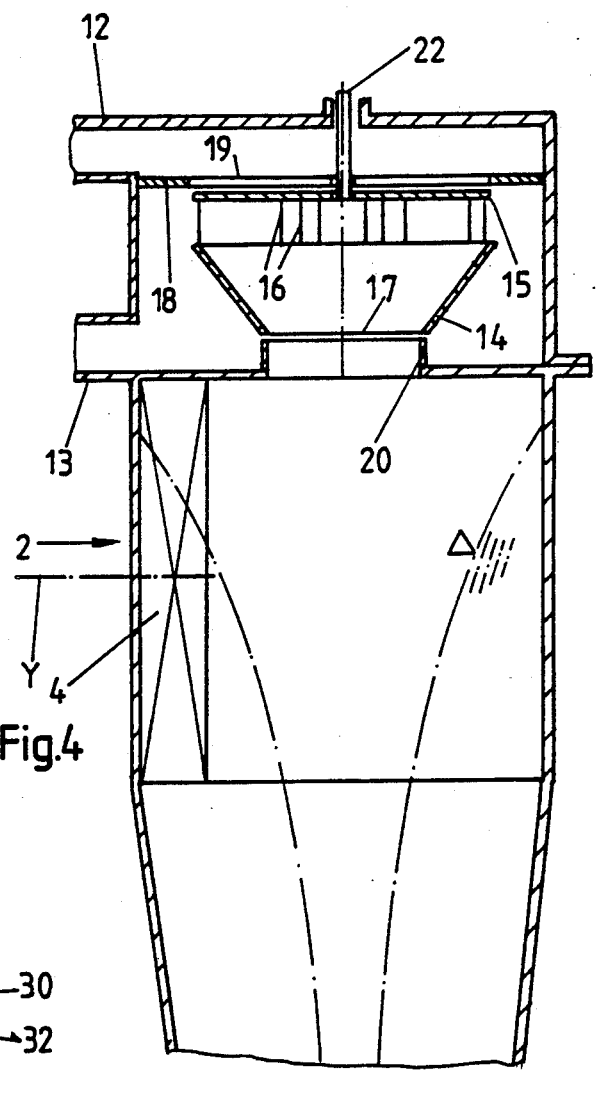
FIG. 4 shows an enlargement of the upper part of the deaeration device.
Figure 5:
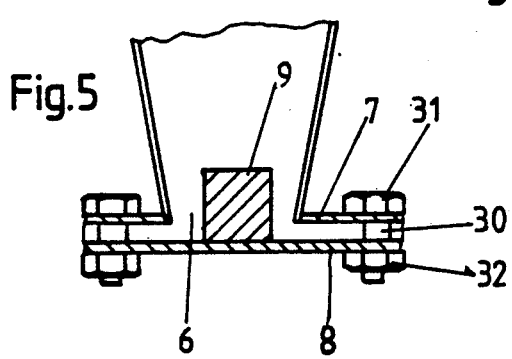
FIG. 5 is an enlargement of the lower part of the deaeration device.

Indicated in FIGS. 3 and 4 by dash-dot lines, the liquid column adjusts itself as a vortex in the hydrocyclone. As is evident, this vortex is through back pressure buildup so adjusted that sufficient space remains at the inlet opening 4 for the foam to enter. This foam is forced upward along with the separated air and proceeds through the feed socket 20 into a suction socket 14 of the rotor 10 of the mechanical foam eliminator part 5. In this case, this part 5 is fashioned as a slip-on part to the hydrocyclone 1. Part 5 may also be connected to inlet section 2 of hydrocyclone 1 via a pipe. The rotor 10 features an impeller wheel whose design features radial blades 16 and a cover plate 15. This impeller wheel is driven via a shaft 22 by a motor 21 which by means of a pillow block 23 bears on the slip-on part 5.

The suction socket features an inlet opening 17 which is essentially smaller than the outside diameter of the rotor blades 16. The opening angle of this truncated cone-shaped suction socket ranges between 70° and 105°. The suction effect exerts high shear forces on the foam bubbles, which, as far as they have not been destroyed yet at the end of the suction socket, are further destroyed yet due to the baffle effect of the radial blades and the further acceleration occurring there. The separated air thus can escape from the socket 12, at the top, while the deaerated liquid drains through the socket 13 on the bottom part of the mechanical foam eliminator. However, this fluid still contains a considerable share of air, but especially also of printing ink, if the suspension is a wastepaper fiber suspension from printed paper, such as newspapers, boxes or similar. This liquid quantity is preferably cleaned further in a secondary flotation system. This is indicated in FIG. 2 by the pump 39, which feeds the deaerated liquid by way of line 46 to the secondary flotation device 60, after it was introduced in a collection tank 38 by way of line 42.

Figure 2:
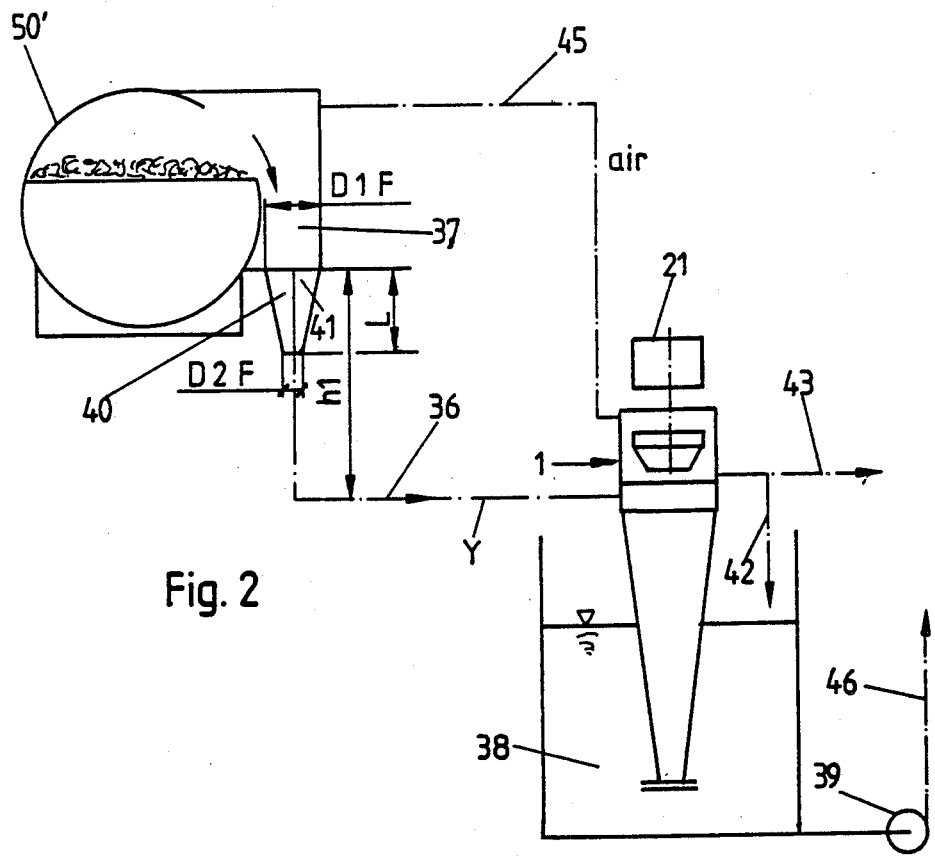
FIG. 2 shows essentially a cross section of the flotation device, somewhat scaled up and in principle, and in sequential setup also showing the deaeration device.

FIGS. 1 and 2 show basically the sequencing and the primary flotation device 50, along with the secondary flotation device 60. The primary flotation device consists of a series of individual flotation cells 50', 50", etc. in a parallel arrangement, which through lines 51' and 51" are serially connected. These lines each empty in mixture supply devices 52', 52", etc., which introduce the suspension that is to be flotated, and is mixed with air, into the individual flotation cells. Common to all flotation cells is a foam chute which in relation to the primary flotation device is indicated as 37 in FIG. 2. Located at the bottom of this foam chute is the drain, or outlet, opening 41 for the heavily foam- and air-laden slush of the flotation process, which through a drain funnel 40 is introduced in the line 36 which carries the suspension mixture to the hydrocyclone 1. The slope of the funnel walls relative to the center axis of the drain funnel is preferably between 1:8 and 1:15. The height spacing $h_1$ between the drain opening 41 of the foam chute 37 and the center axis Y of the inlet opening 4 of the hydrocyclone 1 should amount to at least 2.5 m.

The outlet opening for the deaerated fluid of the hydrocyclone, at its truncated cone point, is arranged in a collection tank 38 in which a suspension level comes about that is so controlled that the desired back pressure to the vortex flow in the hydrocyclone will be generated. This fluid level should correspond to approximately 1.5–2 m of water head. The air separated in the deaeration device can be reintroduced, for instance by way of line 45, in the area of the foam chute 37 of the primary flotation device. Obtained thereby is a closed system in terms of annoyance by odor.

As a dimensioning guideline for the drain funnel of the foam chute 37, the following approximate values may be assumed:

$D_{1F} = 500$ mm, $D_{2F} = 300$ mm which diameter then corresponds also to the pipe 36, and $L_F = 1000$ mm.

The suction socket 14 is preferably an integral part of the rotor of the mechanical foam eliminator 5. However, it need not absolutely be designed as a slip-on part for the hydrocyclone, but it may be connected with the outlet opening 20 of it via a pipe, so that it may then be located, e.g., approximately at the level of the bottom of the foam chute 37. Also a still higher arrangement is quite possible. Additionally, it is also possible to arrange this foam eliminator in such a way that the axis of rotation of its rotor will be situated horizontally. The height difference between the bottom of the foam chute 37 and inlet opening 4 of the hydrocyclone is essentially contingent on the properties of the foam (for instance of its resistance to collapse).

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device for separation of air from a suspension wherein said suspension accrues in a flotation device as a substantially foam-laden slush and passes from said flotation device through a drain opening to said device, comprising:
   a hydrocyclone, said hydrocyclone having an inlet section arranged at a top portion thereof, said inlet section including an inlet opening through which the suspension is fed into the hydrocyclone, said inlet opening having a center axis aligned so that said center axis is positioned at least 2.5 m below said drain opening, a truncated cone-shaped separation section following downwardly from said inlet section, said separation section having a truncated cone point at a lower portion thereof and having a cone point angle ranging between 8 and 16 degrees, said truncated cone point defining an outlet opening for a low-air fluid portion of said suspension, said hydrocyclone further including a baffle plate spaced from said outlet opening a distance of between 10–25% of the diameter of said outlet opening; and
   a mechanical foam eliminator, said mechanical foam eliminator being positioned generally above said inlet section of the hydrocyclone and including means for connecting said mechanical foam eliminator to said hydrocyclone, said mechanical foam eliminator including a generally funnel-shaped suction socket having an inlet opening wherein foam enters said mechanical foam eliminator from said hydrocyclone and an outlet opening and passes to a rotor wheel having radial blades, said suction socket having a height between 1.5 and 4 times the height of said blades, said inlet opening being defined by the narrower end of said generally funnel-shaped suction socket.

2. The device of claim 1, wherein said cone point angle ranges between 8 and 12 degrees.

3. The device of claim 1, wherein the mechanical foam eliminator is connected via a pipe with said inlet section of the hydrocyclone.

4. The device of claim 1, wherein said inlet opening of the hydrocyclone comprises a narrow, rectangular opening, wherein the ratio of the width (b) to the height (h) of said opening is related such that $b/h = 0.25$ to $0.35$.

5. The device of claim 1, including a generally cylindrical vortex core support positioned on said baffle plate and extending into said outlet opening of the hydrocyclone, said vortex core support having a diameter of 10 to 20% and a height of 3 to 8% of the diameter of said outlet opening.

6. The device of claim 1, including a backing plate for said baffle plate, wherein said backing plate is mounted at said outlet opening of the hydrocyclone and extends radially outward from said truncated cone-shaped section, said backing plate being generally parallel to said baffle plate.

7. The device of claim 1, wherein the diameter of the backing plate is between two and three times greater than the diameter of the outlet opening of the hydrocyclone.

8. The device of claim 1, wherein the diameter of the baffle plate is between two and three times greater than the diameter of the outlet opening of the hydrocyclone.

9. The device of claim 1, wherein said mechanical foam eliminator is positioned maximally 8 m above said center axis of the inlet opening of the hydrocyclone.

10. A system for the separation of air from a suspension, comprising:

a flotation device wherein said suspension accrues as a substantially foam-laden slush, said flotation device including a foam chute, said foam chute having a drain opening at the bottom thereof, said flotation device further including a drain funnel for said foam-laden slush arranged downwardly from said drain opening, said drain funnel having a funnel wall and a center axis, said funnel wall having an inclination relative to said funnel center axis between 1:8 and 1:15;

a hydrocyclone having an inlet section arranged at a top portion thereof, said inlet section including an inlet opening through which the substantially foam-laden slush is fed from said flotation device, said inlet opening having a center axis aligned so that said axis is positioned at least 2.5 m below said drain opening, a truncated cone-shaped separation section following downwardly from said inlet section, said separation section having a truncated cone point at a lower portion thereof and having a cone point angle ranging between 8 and 16 degrees, said truncated cone point defining an outlet opening for a low-air fluid portion of said suspension, said hydrocyclone further including a baffle plate spaced from said outlet opening a distance of between 10–25% of the diameter of said outlet opening; and a mechanical foam eliminator positioned generally above said inlet section of the hydrocyclone, and including means for connecting said mechanical foam eliminator to said hydrocyclone, said mechanical foam eliminator including a generally funnel-shaped suction socket having an inlet opening wherein foam enters said mechanical foam eliminator from said hydrocyclone and an outlet opening and passes to a rotor wheel having radial blades, said suction socket having a height between 1.5 and 4 times the height of said blades, said inlet opening being defined by the narrower end of said generally funnel-shaped suction socket.

* * * * *